United States Patent
Olaru et al.

(10) Patent No.: US 7,258,536 B2
(45) Date of Patent: Aug. 21, 2007

(54) MOLD AND HOT RUNNER CONTROLLER LOCATED ON THE MACHINE PLATEN

(75) Inventors: George Olaru, Toronto (CA); James Nguyen, Mississauga (CA)

(73) Assignee: Mold-Masters Limited, Georgetown, Ontario (CA)

( * ) Notice: Subject to any disclaimer, the term of this patent is extended or adjusted under 35 U.S.C. 154(b) by 363 days.

(21) Appl. No.: 10/871,570

(22) Filed: Jun. 21, 2004

(65) Prior Publication Data
US 2004/0258787 A1 Dec. 23, 2004

Related U.S. Application Data

(60) Provisional application No. 60/479,909, filed on Jun. 20, 2003.

(51) Int. Cl.
*B29C 45/77* (2006.01)
*B29C 45/78* (2006.01)

(52) U.S. Cl. ................ 425/143; 425/144; 425/145; 425/149; 425/542; 425/564

(58) Field of Classification Search ............ 425/542, 425/564, 566, 143, 144, 145, 149
See application file for complete search history.

(56) References Cited

U.S. PATENT DOCUMENTS

| | | | |
|---|---|---|---|
| 4,023,279 A | 5/1977 | Janda | |
| 4,555,228 A | 11/1985 | Nishiike et al. | |
| 4,648,883 A | 3/1987 | Podder | |
| 4,726,751 A | 2/1988 | Shibata et al. | |
| 4,745,541 A | 5/1988 | Vaniglia et al. | |
| 4,826,418 A | 5/1989 | Kamiguchi | |
| 4,899,288 A | 2/1990 | Tsutsumi | |
| 5,198,240 A * | 3/1993 | Baxi | 425/564 |

(Continued)

FOREIGN PATENT DOCUMENTS

EP 0 606 043 B1 1/1997

(Continued)

OTHER PUBLICATIONS

*Altanium*®$_{CM}$, presentation, American MSI Corporation, Moorpark, California, 9 pages, date unknown (obtained prior to Jun. 20, 2003).

(Continued)

*Primary Examiner*—Tim Heitbrink
(74) *Attorney, Agent, or Firm*—Ridout & Maybee LLP

(57) ABSTRACT

A control module is attached to a machine platen of an injection molding machine. The control module is coupled to at least one sensor that reports a value of a processing condition associated with an injection mold and is disposed within the injection mold. The control module is also coupled to at least one controllable device that varies the processing condition of the injection mold and is disposed within the injection mold. The control module collects and processes sensor output, and provides a control signal to at least one controllable device. A display interface module is linked to the control module. The display interface module accepts user-entered data set-points, provides the user-entered data set-points to the control module, and collects the processed sensor output from the control module for display to a user.

19 Claims, 7 Drawing Sheets

U.S. PATENT DOCUMENTS

| | | | |
|---|---|---|---|
| 5,206,033 | A | 4/1993 | Stastny |
| 5,316,707 | A | 5/1994 | Stanciu et al. |
| 5,320,513 | A | 6/1994 | Schmidt |
| 5,435,711 | A | 7/1995 | Yamada |
| 5,456,870 | A | 10/1995 | Bulgrin |
| 5,523,640 | A | 6/1996 | Sparer et al. |
| 5,525,050 | A | 6/1996 | Takizawa et al. |
| 5,795,511 | A | 8/1998 | Kalantzis et al. |
| 5,922,367 | A | 7/1999 | Assalita et al. |
| 6,000,831 | A | 12/1999 | Triplett |
| 6,275,741 | B1 | 8/2001 | Choi |
| 6,421,577 | B1 | 7/2002 | Triplett |
| 6,529,796 | B1 | 3/2003 | Kroeger et al. |
| 6,649,095 | B2 | 11/2003 | Buja |
| 6,913,453 | B2 | 7/2005 | Kalantzis |
| 2003/0154004 | A1 | 8/2003 | Kroeger et al. |

FOREIGN PATENT DOCUMENTS

| | | | |
|---|---|---|---|
| JP | 2000-263597 | A | 9/2000 |
| JP | 2001-191381 | A | 7/2001 |
| JP | 2002-225081 | A | 8/2002 |
| WO | WO98/34773 | A1 | 8/1998 |
| WO | WO 01/07229 | A2 | 2/2001 |
| WO | WO 01/28752 | A1 | 4/2001 |

OTHER PUBLICATIONS

*Altanium®*, "hot runner temperature controls," American MSI Corporation, Moorpark, California, 8 pages, Copyright 2002.

*Caco Pacific Corporation—Caco Standards—Controller—IPM* <http://www.cacopacific.com/controller.htm>, Caco Pacific Corporation, 2 pages, Copyright 2000.

*Fast Heat—Junction Boxes* (visited Oct. 28, 2004) <http://www.fastheatuk.com/junctionboxes.html>, Fast Heat UK Limited, 3 pages (some information may predate Jun. 20, 2003).

Gammaflux / Hot Runner Temperature Control Systems, Press Releases, *New 9600 Series Hot Runner Control System From Gammaflux Saves Floor Space*, Gammaflux L.P., Sterling, Virginia, 2 pages, Nov. 1, 1999 (viewed online at <http://www.gammaflux.com/en/viewpr.html?prid=199911011>).

"Hot Runner Controls," *Plastics In Canada*, 3 pages, Feb./Mar. 2003.

*Hot-Runner Controls Mount Right on the Mold—American MSI Corp.*—Jan. 1999, Plastics Technology Online Article, 1 page, Jan. 1999 (viewed online at <http://www.plasticstechnology.com/articles/kuw/12290.html>).

*PMS Systems Product Line—CN Series*, "The K-Series" (visited Oct. 28, 2004) <http://www.pmssystems.com/k.htm>, PMS Systems Ltd., Hereford, UK, 4 pages (some information may predate Jun. 20, 2003).

*PMS Systems Product Line—TS Touch Console*, "KTS2 Touch Consoles" (visited Oct. 28, 2004) <http://www.pmssystems.com/kts.htm>, PMS Systems Ltd., Hereford, UK, 2 pages (some information may predate Jun. 20, 2003).

PMS Systems, *User Manual For HRC A-Series Of Hot Runner Controllers*, Issue 3.2, PMS Systems Ltd., Hereford, UK, pp. 1-71, Copyright 2000 (PMS Developments).

PMS Systems, *User Manual For HRC E-Series Of Hot Runner Controllers*, Issue 3.3, PMS Systems Ltd., Hereford, UK, pp. 1-78, Copyright 2000 (PMS Developments).

PMS Systems, *User Manual For HRX Series Of Hot Runner Controllers*, Issue 2.4, PMS Systems Ltd., Hereford, UK, pp. 1-62, Copyright 1999 (PMS Developments).

*Pulse™ Series Technical Specifications, Heater & T/C Cables*, 1 page, source unknown, date unknown (obtained prior to Jun. 20, 2003).

*Symphony 2000® Series Control System*, 4 pages, source unknown, date unknown (obtained prior to Jun. 20, 2003).

*Synventive Molding Solutions—Products*, 2 pages, source unknown, date unknown (obtained prior to Jun. 20, 2003).

*Temperature Controllers, Hot Runner Control Accessories*, "$MX_{T-M}$ Hot Runner Injection Mold Temperature Control Systems" (viewed online at <http://www.tempco.com/Catalog/section%2013-pdf/Section%2013.pdf>, p. 7), Tempco Electric Heater Corporation, Wood Dale, Illinois, 1 page, date unknown (obtained prior to Jun. 20, 2003).

English Abstract for Japanese Patent Publication No. 2000-263597 A, 1 page, provided by the European Patent Office, Copyright 2000 (JPO).

English Abstract for Japanese Patent Publication No. 2001-191381 A, 1 page, provided by the European Patent Office, Copyright 2001 (JPO).

English Abstract for Japanese Patent Publication No. 2002-225081 A, 1 page, provided by the European Patent Office, Copyright 2002 (JPO).

European Search Report from European Patent Application No. 04014495.8, 3 pages, dated Dec. 13, 2004.

Guide to Better Hot Runner Control—White Paper—Moldflow Corporation, 2004, (viewed online at www.moldflow.com/stp/pdf/hrpc/hrcguide.pdf), 14 pages.

Altanium—Moldflow Corporation, 2004, (viewed online at www.moldflow.com/stp/pdf/eng/Altanium_B_E.pdf), 8 pages.

\* cited by examiner

MOLD AND HOT RUNNER CONTROLLER LOCATED ON THE MACHINE PLATEN

CROSS-REFERENCE TO RELATED APPLICATIONS

This application claims benefit under 35 U.S.C. § 119(e) to U.S. Provisional Application No. 60/479,909, filed Jun. 20, 2003, entitled "Mold and Hot Runner Controller Located on the Machine Platen," which is incorporated by reference herein in its entirety.

BACKGROUND OF THE INVENTION

1. Field of the Invention

The present invention relates generally to injection molding system controllers, and more specifically to mold and hot runner controllers.

2. Background Art

Injection molding systems are used to form objects of a type of plastic or resin, or other materials such as metals or powders. Typically, an injection molding system includes an injection molding machine that has an extruder, machine platens that may be connected by tie bars and a machine base. The machine platens are used to secure mold plates including the mold cavities and the mold cores. Each mold typically has two parts, a cold-half and a hot-half. During the injection molding process, the cold-half is mated with the hot-half to form the appropriate shape. The hot-half includes a hot runner system having a manifold and one or several hot runner nozzles that contain flow passages through which a melt stream reaches the mold cavity via a single or several mold gates. For optimal molding, the melt stream must remain within a fairly narrow window of operating processing parameters, such as temperature and pressure. For this reason, the cold-half and the hot-half of the mold typically include sensors for monitoring such physical properties of melt. For example, the hot-half typically includes appropriately positioned thermocouples to monitor the temperature at various locations such as along the flow path of the melt, for example.

Injection molding systems typically include at least one machine controller for monitoring and adjusting the most critical processing conditions, such as temperature or pressure, within the injection molding machine and sometimes in the mold. In some cases, there is a need for a separate hot runner or mold controller in addition to the machine controller. The hot runner controller is typically located on the machine shop floor by the injection molding machine and receives information from the sensors via cables linked to the mold and to the controller. To better control the characteristics of the melt in an injection molding system during processing, in a typical injection molding system, there are numerous zones that need to be separately monitored and adjusted in order for optimal molding to occur within each mold cavity. Therefore, each zone of a typical injection molding system has its own self-regulating closed-loop control.

Injection molding systems use microprocessor-based controllers for monitoring and adjusting processing conditions within the mold. A controller typically responds to the output of sensors placed at appropriate locations within the hot-half of the mold by sending a control signal to a device within the injection molding system that can vary the processing condition as requested by the control signal. For example, if a sensor in the mold reports that a certain zone of the mold is at too low of a temperature, the controller will respond by sending a control signal to the heating device that can then raise the temperature to the appropriate level for that zone.

In a typical injection molding control system, the mold sensors provide signals to the controller when reporting a processing condition of the mold. These signals are communicated from each sensor to the controller through wires and in an injection molding system with 32, 64, or 96 cavities, there could be hundreds of wires needed. In a typical injection molding system, the controller is set a distance away from the mold due to its typically large size. The number and size of cables required to carry the wires from the injection mold to the controller is cumbersome in that the cables need to run along the floor, under the floor, or above the floor creating spatial, storage, and machine access problems and inconvenience.

In addition to its typically large size, the controller of a typical injection molding system is also set a distance away from the mold to protect it from the high temperatures normally associated with the injection molding process. The heat generated from the injection molding process may possibly have an adverse effect on the performance and operability of the electronics within the controller, if the control module is attached to the injection mold itself. Known controllers that are attached to the mold require a cooling mechanism to prevent such adverse effects. Also, these controllers are totally dedicated and customized to the specific mold and hot runner system so they can move with the mold and the hot runner system from one machine to another. A new mold and a new hot runner system used to inject new articles will usually require a newly customized controller. Further, in a typical injection molding system, a controller and a customized hot runner system must be compatible and have compatible connections.

BRIEF SUMMARY OF THE INVENTION

In one aspect of the present invention there is provided an injection molding machine that includes an injection mold, including a mold cold-half and a mold hot-half, mounted to a machine platen, at least one controllable device coupled to the injection mold for varying a processing condition of the injection mold, at least one sensor coupled to the injection mold that reports a value of the processing condition, and a control module mounted on the machine platen. The control module is in communication with the at least one sensor and the at least one controllable device. The control module collects an output from the at least one sensor, processes the sensor output, and provides a control signal to the at least one controllable device.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art(s) to make and use the invention.

Figure 1:
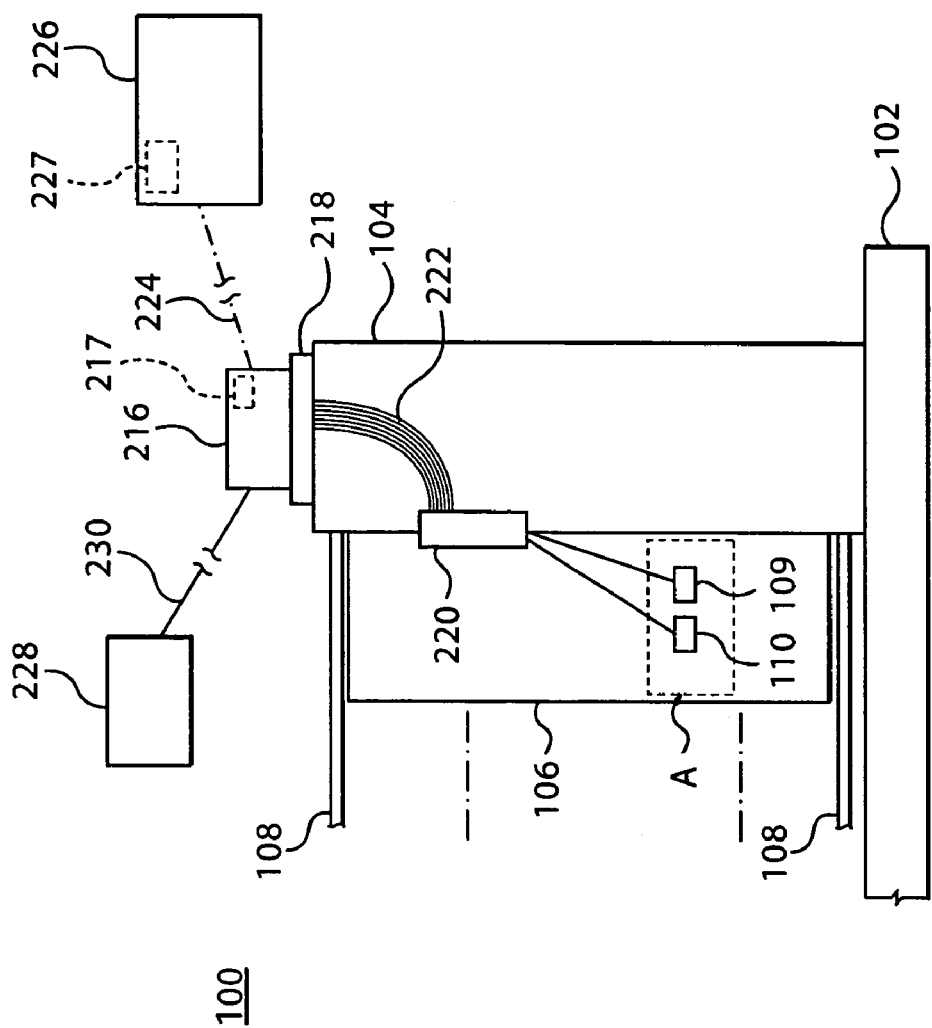
FIG. 1 is a side view of a portion of an injection molding machine according to an embodiment of the present invention.

The features and advantages of the present invention will become more apparent from the detailed description set forth below when taken in conjunction with the drawings in which like reference characters identify corresponding elements throughout. In the drawings, like reference numbers generally indicate identical, functionally similar, and/or structurally similar elements.

DETAILED DESCRIPTION OF THE INVENTION

Figure 2A:
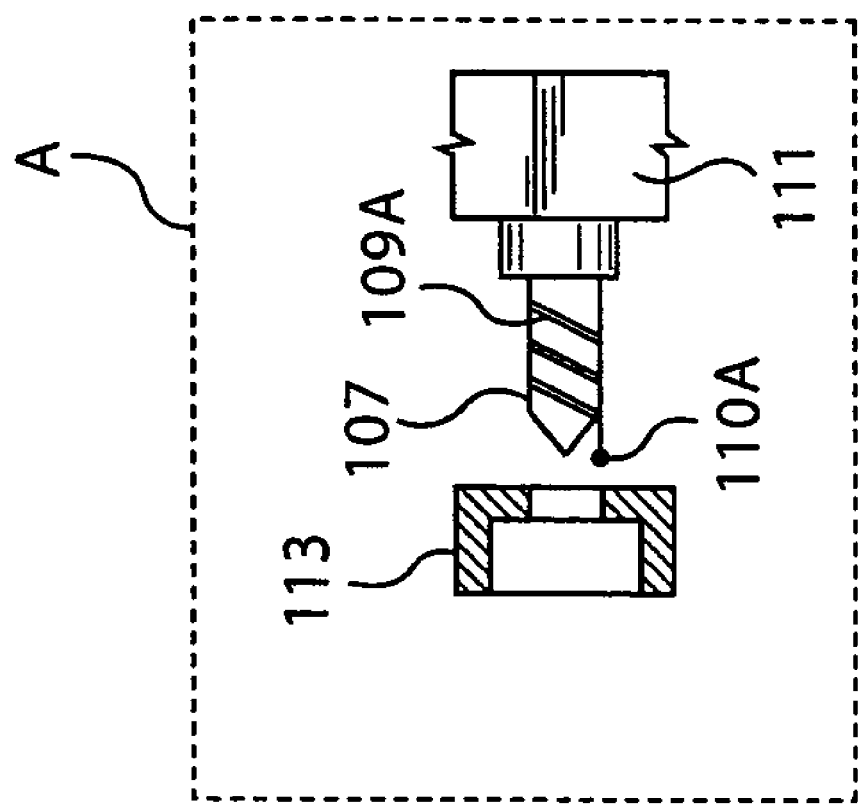
FIG. 2A is a detailed view of portion A in FIG. 1.
Figure 2B:
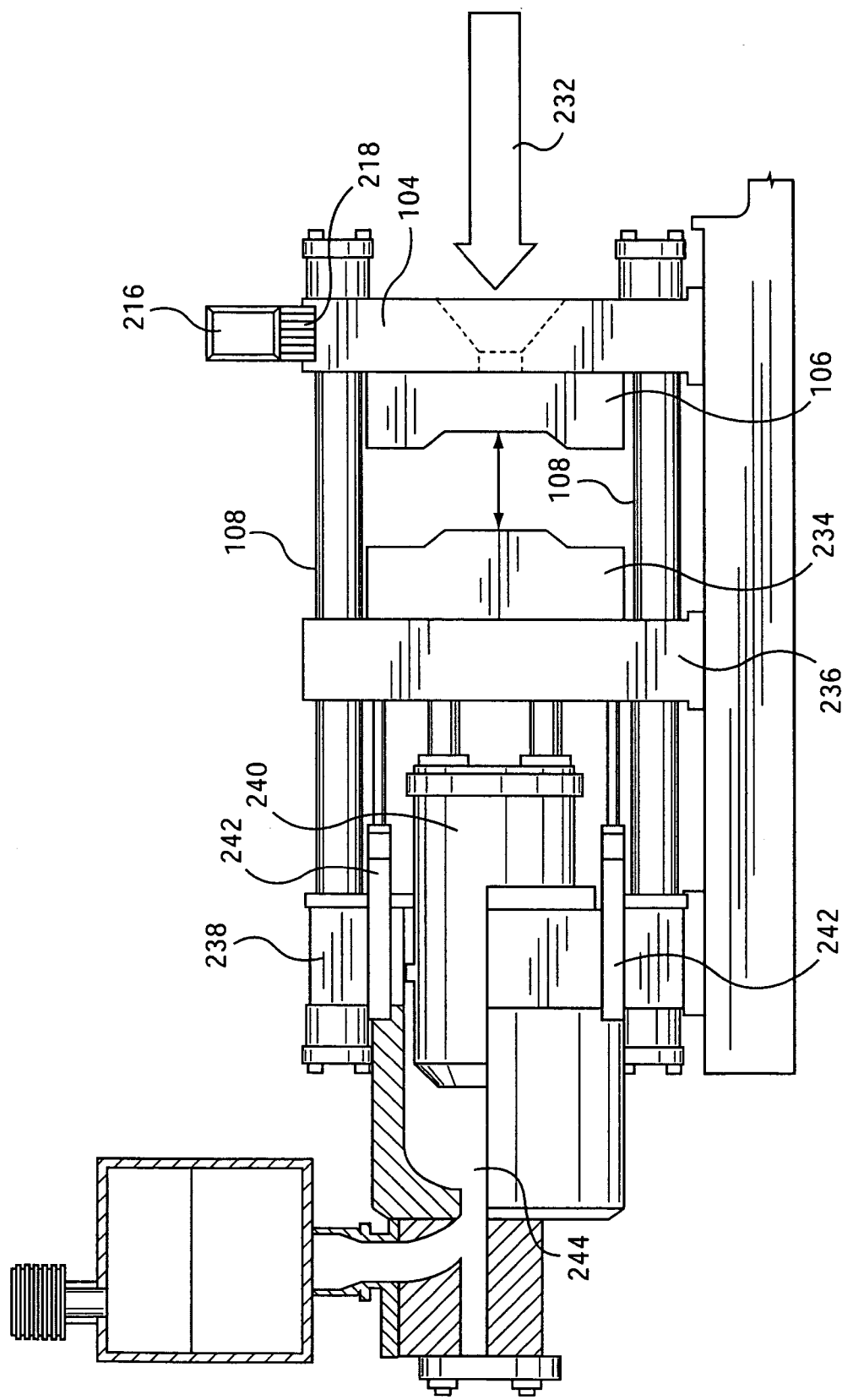
FIG. 2B is a broader view of the injection molding machine of FIG. 1.

Referring to FIGS. 1 and 2A, an injection molding machine 100 is generally shown. The injection molding machine includes a stationary machine platen 104 that is mounted on a machine base 102 and an injection mold. The injection mold includes a mold hot-half 106 that is removably coupled to the machine platen 104 and a mold cold-half 234, which is shown in FIG. 2B. The mold cold-half 234 is slidable along machine tie bars 108 to mate with the mold hot-half 106. As shown in FIG. 2A, the mold hot-half 106 includes at least one hot runner nozzle 107, which is coupled to a manifold 111. The manifold 111 receives a melt stream of moldable material from a source (not shown) and delivers the melt stream through nozzle 107 to a mold cavity 113. Mold cavity 113 is provided between the mold hot-half 106 and the mold cold-half 234.

The nozzle 107 is heated by a heater 109A. A thermocouple 110A is coupled to the nozzle 107 in order to provide temperature measurements thereof. It will be appreciated by those skilled in the art that other sensors 110 may also be provided in the mold hot-half to monitor processing conditions, such as pressure, for example.

A control module 216 is mounted on the stationary machine platen 104 via a machine plate connector 218. Instead of the control module 216 being mounted externally to the stationary machine platen 104, control module 216 may alternatively be mounted within stationary machine platen 104. At least one cable 222 links machine plate connector 218 to a mold plate connector 220. Cable 222 includes at least one wire for carrying signals toward control module 216 and at least one wire for carrying signals away from control module 216. Specifically, in one embodiment, there are two wires used for each zone monitored, such that one wire carries sensor output signals toward control module 216 and one wire carries power signals from control module 216 to a controllable device 109 such as a heater. Signal carrying may be done using fiber optic technology or other technology known by those skilled in the art.

The mold plate connector 220 is connected to mold hot-half 106 of the injection mold, and specifically connected to sensors 110, such as thermocouple 110A (of FIG. 2A), within mold hot-half 106. The connectors 218, 220 and cable 222 may be housed within stationary machine platen 104 or may be external thereto. The location of control module 216 on the stationary machine platen 104 is such that bundles of cabling within the workspace is not required, and heat generated during the injection molding process does not adversely affect the operation of control module 216.

Figure 3:
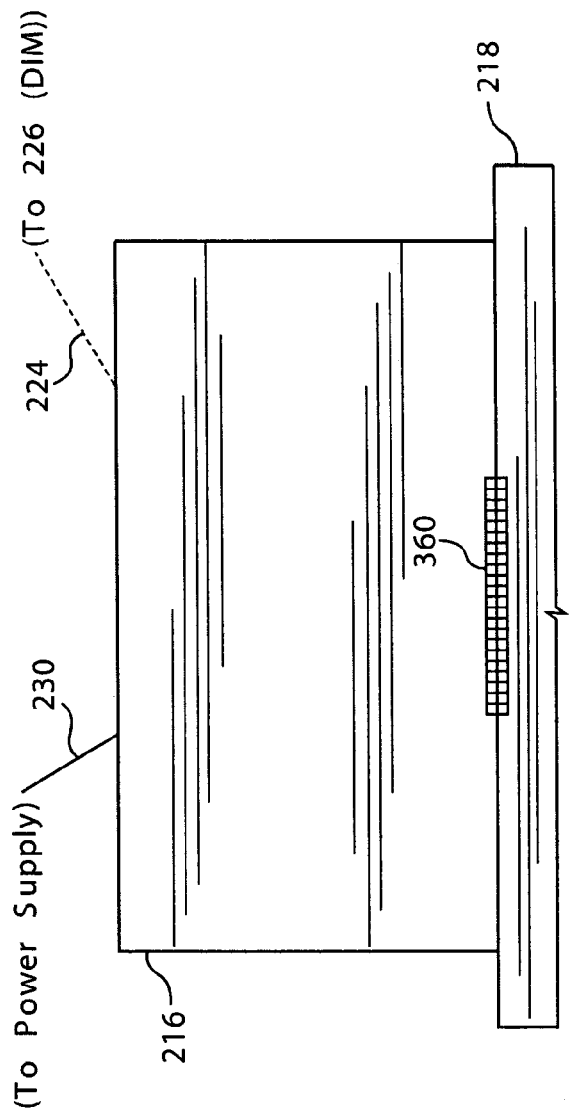
FIG. 3 shows the connection of a control module to a first connector according to an embodiment of the present invention.

The machine plate connector 218 is generally an electrical box, through which one end of cable 222 is connected to control module 216. In one embodiment, as shown in FIG. 3, the connection between control module 216 and machine plate connector 218 is via a plug connector 360. The use of such a connector makes the removal and replacement of control module 216 quick and efficient. Alternative types of connectors may also be used, as will be evident to those skilled in the art.

Referring back to FIG. 1, cable 222 and mold plate connector 220 may be exchanged for a different cable 222 and mold plate connector 220 in order to be compatible with different types of injection molds that are produced by various manufacturers. This allows the same control module 216 to be used with injection molds made by various manufacturers and does not depend on the mold manufacturer. This makes the control module more versatile and allows changeover of the injection molding machine to be more efficient and less time-consuming. Similarly, the flexibility of usage and placement of control module 216 and machine plate connector 218 allow control module 216 to be quickly and easily moved to another machine. Further, control module 216 may be removed and used for testing an injection mold when it is not attached to a machine.

Control module 216 obtains 3-phase 220-volt AC power from a power supply 228 that is either located on the injection molding machine 100, on the machine platen 104, in a module (not shown) attached to the control module 216 or on the floor separate from the machine 100. Power from power supply 228 is delivered to control module 216 via power cable 230.

Control module 216 functions to monitor and respond to signals provided by sensors 110. For example, in an embodiment in which sensor 110 is a thermocouple for sensing temperature, sensor 110 sends an output signal with temperature data to control module 216 via a wire carried in cable 222. Control module 216 receives the sensor output signal and processes it. If the temperature needs to be increased, control module 216 sends a control signal via a wire carried in cable 222 to provide more power to controllable device 109, in this case a heater. If the temperature needs to be decreased, control module 216 sends a control signal via a wire carried in cable 222 to provide less power to controllable device 109.

Referring to FIG. 2B, injection molding machine 100 is shown in greater detail. As shown, machine injection unit 232 couples with stationary machine platen 104 to deliver the melt stream thereto. Further, mold cold-half 234 is attached to moving machine platen 236. In operation, moving machine platen 236 is movable along tie-bars 108 by stroke cylinders 242, allowing the mold hot-half 106 to mate with mold cold-half 234 forming a complete injection mold. A clamp cylinder 244 includes a clamp column 240 that is attached to fixed clamp platen 238. The clamp column 240 pushes moving machine platen 236 and mold cold-half 234 toward the stationary mold hot-half 106 and maintains the cold-half 234 and hot-half 106 in abutment once mated in order to prevent separation during the injection process.

Figure 2C:
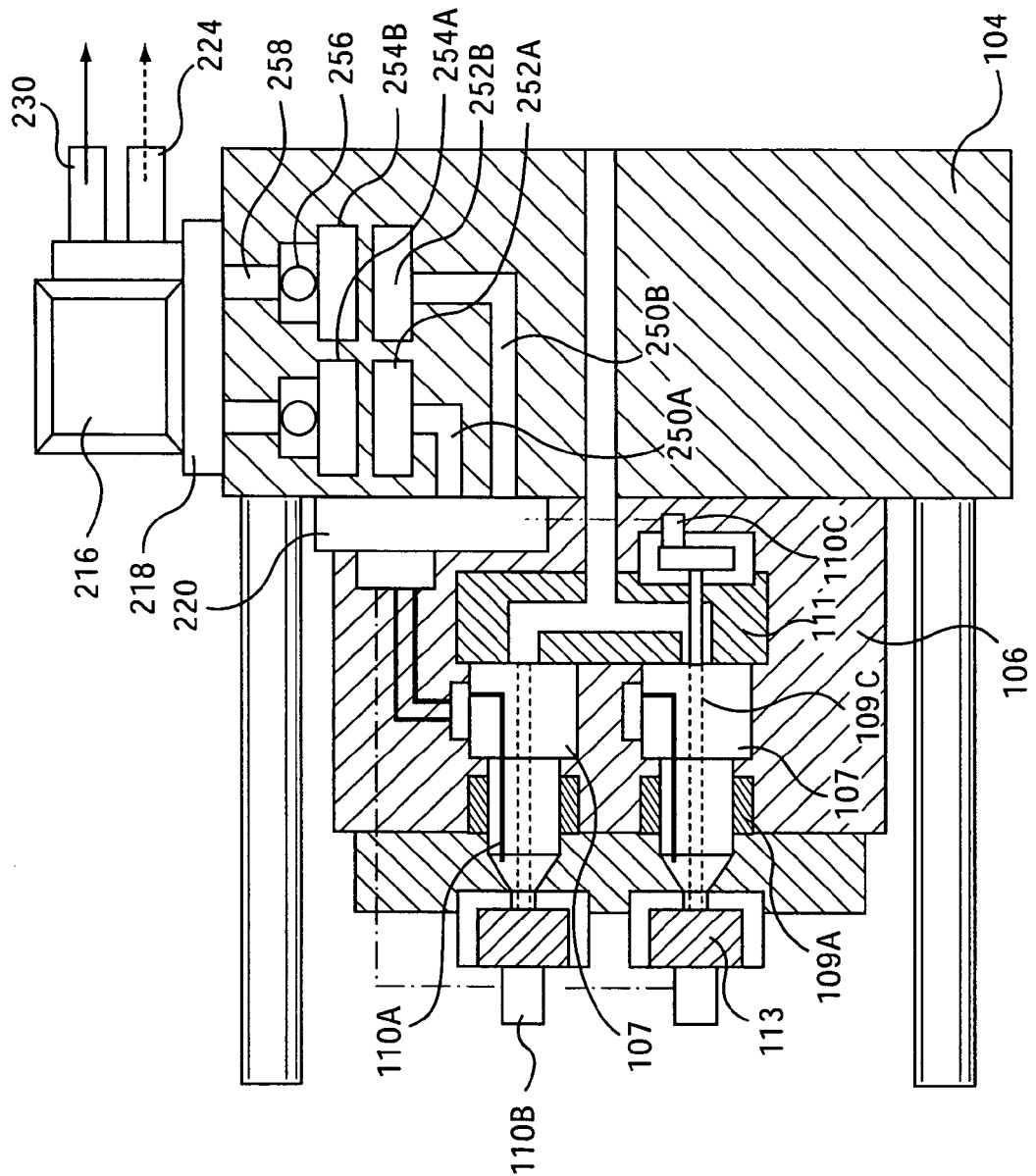
FIG. 2C shows the injection molding machine of FIG. 2B in greater detail.

Referring to FIG. 2C, various sensors 110A, 110B, 110C that may be monitored as described are shown. These sensors include, but are not limited to, temperature sensors 110A, pressure sensors 110B, and valve pin position sensors 110C. The controllable devices 109 include heater 109A and valve pin 109C.

Cable 222, which was shown in FIG. 2A, is shown in greater detail in an embodiment for two zones. A typical injection molding machine includes many more zones, however two are depicted here for simplicity. Each zone includes a mold cable 250A, 250B, which is coupled to mold plate connector 220, a custom mold connector 252A, 252B and a hot runner connector 254A, 254B. Adapters 256 and machine cables 258 for the hot runner connectors 254A, 254B link the runner connectors 254A, 254B to the machine plate connector 218, which in turn is connected to control module 216. The adapters 256 allow the control module to be linked to injection molds of various manufacturers.

Figure 4:
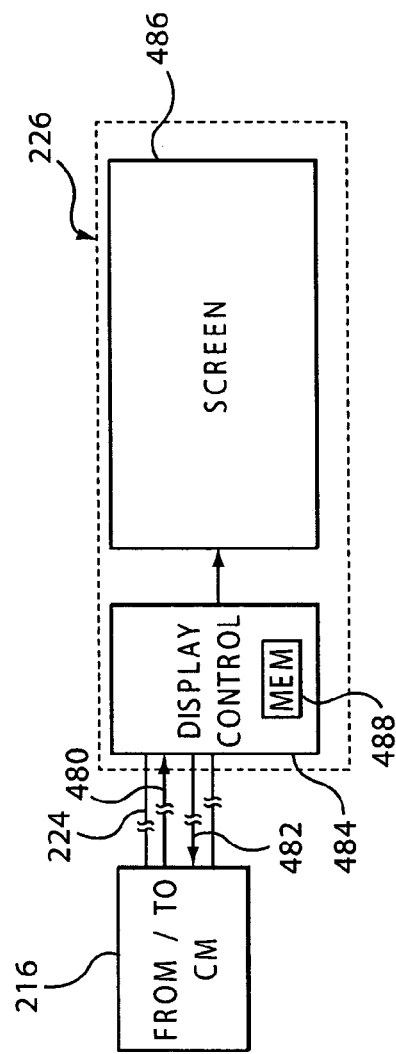
FIG. 4 is a functional block diagram of a display interface module according to an embodiment of the present invention.

According to an embodiment of the injection molding machine 100, a display interface module (DIM) 226, which is shown in FIG. 1, is provided. The DIM 226 has three main functions. Referring to the block diagram of FIG. 4, one function of DIM 226 is to receive processed sensor output data signals 480 from control module 216, store data 480 in a memory 488 located within a DIM control unit 484, and display data 480 to a user upon a screen 486. A second function of DIM 226 is to accept user-entered set-point data such as temperature set-point data or pressure set-point data, for example, store user-entered set-point data in a memory 488 located within the DIM control unit 484, and provide user-entered set-point data 482 to control module 216. Communication, including signals 480, 482 between DIM 226 and control module 216, occur through a communications interface, such as a serial communications interface. These communications may be carried by wires within a process data cable, via wireless means, or by other means of communications commonly used or known by those skilled in the art. For example, communications between DIM 226 and control module 216 may be accomplished via transceiver 217 in control module 216 and transceiver 227 in DIM 226, shown in FIG. 1. The communication carrier for communications to and from DIM 226 and control module 216 is depicted generically as 224. A third main function of DIM 226 is to switch the power to control module 216.

The memory 488 within DIM 226 can store both historical information as collected from sensors 110 as well as user-entered set-point data 482 that represent desired values of processing conditions within mold hot-half 106. DIM 226 may also include memory, such as memory 488, for storing digital or video data collected from cameras that could be mounted within the injection molding system for monitoring purposes. DIM 226 is easily portable and can be interchanged with other injection molding machines. For example, DIM 226 can stand apart from an injection molding system, can be hard-mounted onto the injection molding system, or can be attached to any convenient location on the injection molding machine using a magnet or a swingable arm (not shown), for example. The portability of DIM 226, along with its memory feature, allow user-entered set-point data to be ready for immediate use on other injection molding systems within a manufacturing setting.

Figure 5:
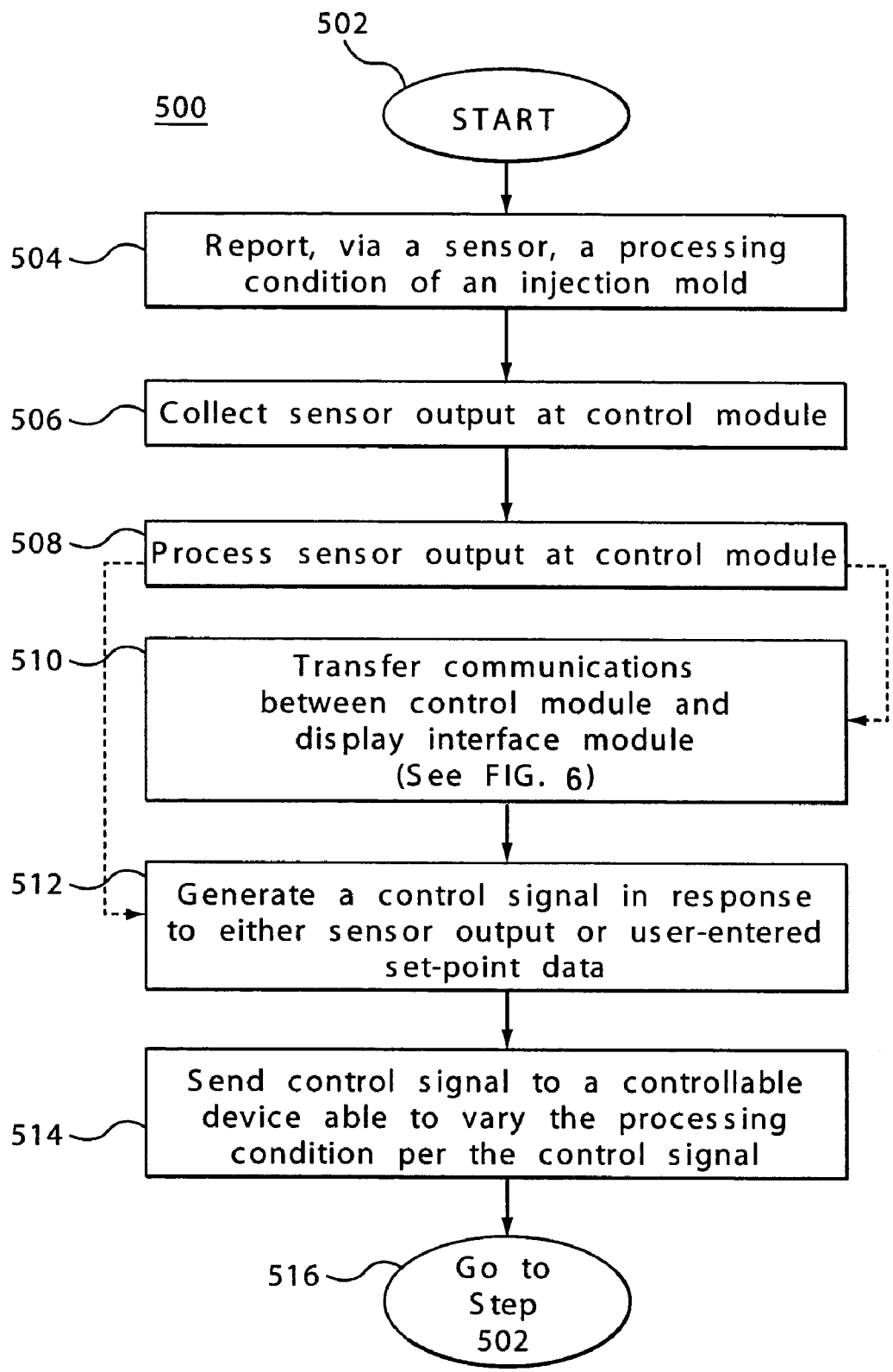
FIG. 5 depicts an injection molding control system method according to the present invention.

FIG. 5 depicts a method of operating a control system of an injection molding machine 100 and is generally indicated by reference numeral 500.

As shown, in step 504, a processing condition of an injection mold is reported by a sensor within the injection mold. In step 506, a control module, such as that described above, collects the sensor output. In step 508, the control module processes the sensor output. In step 510, communications can be exchanged between the control module and a DIM. The communications of step 510 are further depicted in FIG. 6. In step 512, a control signal is generated by the control module in response to the sensor output or in response to user-entered set-point data. In step 514, the control signal is sent to a controllable device that is able to vary the processing condition per the control signal. At step 516, the method repeats at step 502. The control signal does not have to be used only by the controllable device 109 within mold hot-half 106. In another embodiment of the invention, a control signal is also sent to a separate machine controller (not shown) to adjust parameters used by the machine as well. The machine controller is the main controller of the injection molding system machine.

Figure 6:
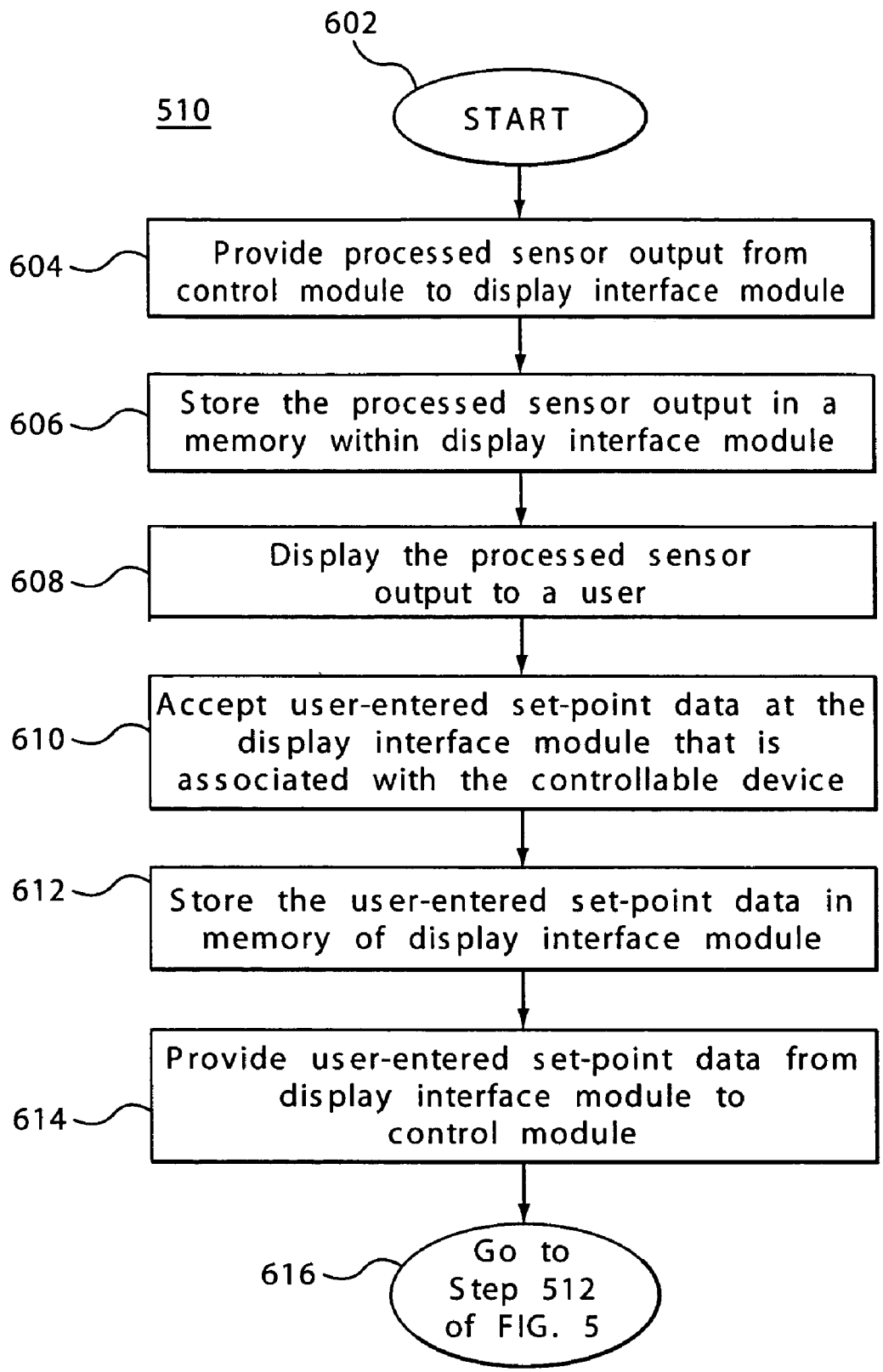
FIG. 6 depicts a more detailed step 510 of the injection molding control system method according to the present invention.

Referring to FIG. 6, step 510 of method 500 is shown in greater detail. Step 510 starts at step 602, and moves immediately to step 604. In step 604, the control module provides processed sensor output to the DIM. In step 606, the processed sensor output is stored in a memory of the DIM. In step 608, the processed sensor output is displayed to a user at the DIM. In step 610, the DIM can accept user-entered set-point data that is associated with a controllable device. In step 612, the user-entered set-point data is stored in memory of the DIM. In step 614, the DIM provides the user-entered set-point data to the control module. In step 616, the method moves on to step 512 of FIG. 5.

According to another embodiment of the invention, processing sensors (not shown) are located on the mold cold-half 234 to monitor various processing conditions, such as the temperature of a mold core coolant, a heater or the mold cavity pressure. The wiring between the sensors 110 located on the mold cold-half 234 and the control module 216 include snap-in connectors or other electrical contacts that physically disengage during the opening of the mold.

While specific embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. An injection molding machine comprising:
   an injection mold mounted to a machine platen, said injection mold having a mold hot-half and a mold cold-half;
   at least one controllable device coupled to said injection mold for varying a processing condition of said injection mold, the processing condition including at least one of temperature, pressure and valve pin position;
   at least one sensor coupled to said injection mold that reports a value of the processing condition; and
   a control module, mounted on said machine platen separately from the injection mold so that the injection mold can be removed from the machine platen without removing the control module from the machine platen, said control module being in communication with said at least one sensor and said at least one controllable device, said control module for collecting an output from said at least one sensor, processing said sensor output, and providing a control signal to said at least one controllable device.

2. The injection molding machine of claim 1, wherein said control module is coupled to said machine platen via a machine plate connector.

3. The injection molding machine of claim 1, further comprising:

a mold plate connector coupled to said mold hot-half, said mold plate connector providing a link between said at least one sensor and said control module.

4. The injection molding machine of claim 1, further comprising:
a machine plate connector for coupling said control module to said machine platen; and
a mold plate connector coupled to said mold hot-half, said mold plate connector providing a link between said at least one sensor and said control module,
wherein said machine plate connector is coupled to a machine cable that communicates with a mold cable that is coupled to said mold plate connector.

5. The injection molding machine of claim 4, wherein an adaptor is provided between said mold cable and said machine cable, said adaptor being removable and interchangeable to accommodate a plurality of different injection molds.

6. The injection molding machine of claim 1, wherein said controllable device is a heater.

7. The injection molding machine of claim 1, wherein said controllable device is a valve pin.

8. The injection molding machine of claim 1, wherein said at least one sensor is a thermocouple.

9. The injection molding machine of claim 1, wherein said mold hot-half includes a manifold and a plurality of hot runner nozzles, and wherein at least one of said manifold and hot runner nozzles includes a sensor and a controllable device communicating with said control module.

10. The injection molding machine of claim 1, further comprising a display interface module located remotely from said control module, wherein said display interface module communicates with said control module.

11. The injection molding machine of claim 10, wherein said display interface module includes data entry means and data memory means.

12. The injection molding machine of claim 10, wherein said display interface module is attached to the injection molding machine.

13. The injection molding machine of claim 12, wherein said display interface module is portable and removably attachable to the injection molding machine.

14. The injection molding machine of claim 1, further comprising a power supply unit connected to said control module.

15. The injection molding machine of claim 14, wherein said power supply unit is located on said machine platen.

16. The injection molding machine of claim 1 the machine platen includes a stationary machine platen and a moving machine platen with one of the injection mold-halfs being mounted to the stationary machine platen and the other of the injection mold-halfs being mounted to the moving machine platen, and the control module is mounted to one of the stationary machine platen and the moving machine platen.

17. The injection molding machine of claim 16 wherein the mold hot-half is mounted to the stationary machine platen and the control module is mounted to the stationary machine platen.

18. The injection molding machine of claim 1 wherein the control module processes said sensor output and provides the control signal to said at least one controllable device to vary the processing condition in dependence on the processed sensor output.

19. The injection molding machine of claim 1 further comprising a display interface module located remotely from said control module and including a memory for storing historical information collected from the at least one sensor and user-entered set-point date that represents desired values of the processing condition.

* * * * *